United States Patent [19]

Selep et al.

[11] 3,837,356

[45] Sept. 24, 1974

[54] HIGH TEMPERATURE VALVE

[75] Inventors: Andrew Selep; Hales Corners; Walter J. Hartwig, all of Hartland, Wis.

[73] Assignee: Allis-Chalmers Corporation, Milwaukee, Wis.

[22] Filed: Apr. 20, 1973

[21] Appl. No.: 353,207

[52] U.S. Cl. ............... 137/375, 251/302, 251/327, 251/328, 251/368
[51] Int. Cl. .......................... F16l 59/16, F16k 3/06
[58] Field of Search ............ 137/375; 251/368, 302, 251/301, 326, 327, 328, 329

[56] References Cited
UNITED STATES PATENTS

| | | | |
|---|---|---|---|
| 1,995,727 | 3/1935 | Wetherbee | 137/375 X |
| 2,575,464 | 11/1951 | Olsen | 137/375 |
| 3,614,061 | 10/1971 | Fitzpatrick | 251/327 |
| 3,759,725 | 9/1973 | Steen | 106/44 |

FOREIGN PATENTS OR APPLICATIONS 961,508   6/1964   Great Britain ...................... 251/302

*Primary Examiner*—Arnold Rosenthal
*Attorney, Agent, or Firm*—Robert C. Sullivan

[57] ABSTRACT

There is provided in accordance with one embodiment of the invention a valve for use under high temperature conditions including a linearly slidable valve member made of silicon carbide and having a valve aperture therein which is slidably movable into or out of registry, or into varying degrees of registry with a fluid passage through the stationary valve bonnet. The slidable silicon carbide valve member cooperates with stationary valve seats in the stationary bonnet structure, which valve seats are also made of silicon carbide. The slidable valve member is guided in its sliding movement by channel-shaped guide members in the stationary bonnet, the guide members also being made of silicon carbide. The stationary valve bonnet in which the slidable valve member is mounted for sliding movement is provided with an outer metal housing of carbon steel or the like and a wall of thermally insulating refractory is interposed between the silicon carbide members (including the slidable valve element) and the metal housing to maintain the metal housing at a sufficiently low temperature to prevent thermal damage to the metal housing.

12 Claims, 13 Drawing Figures

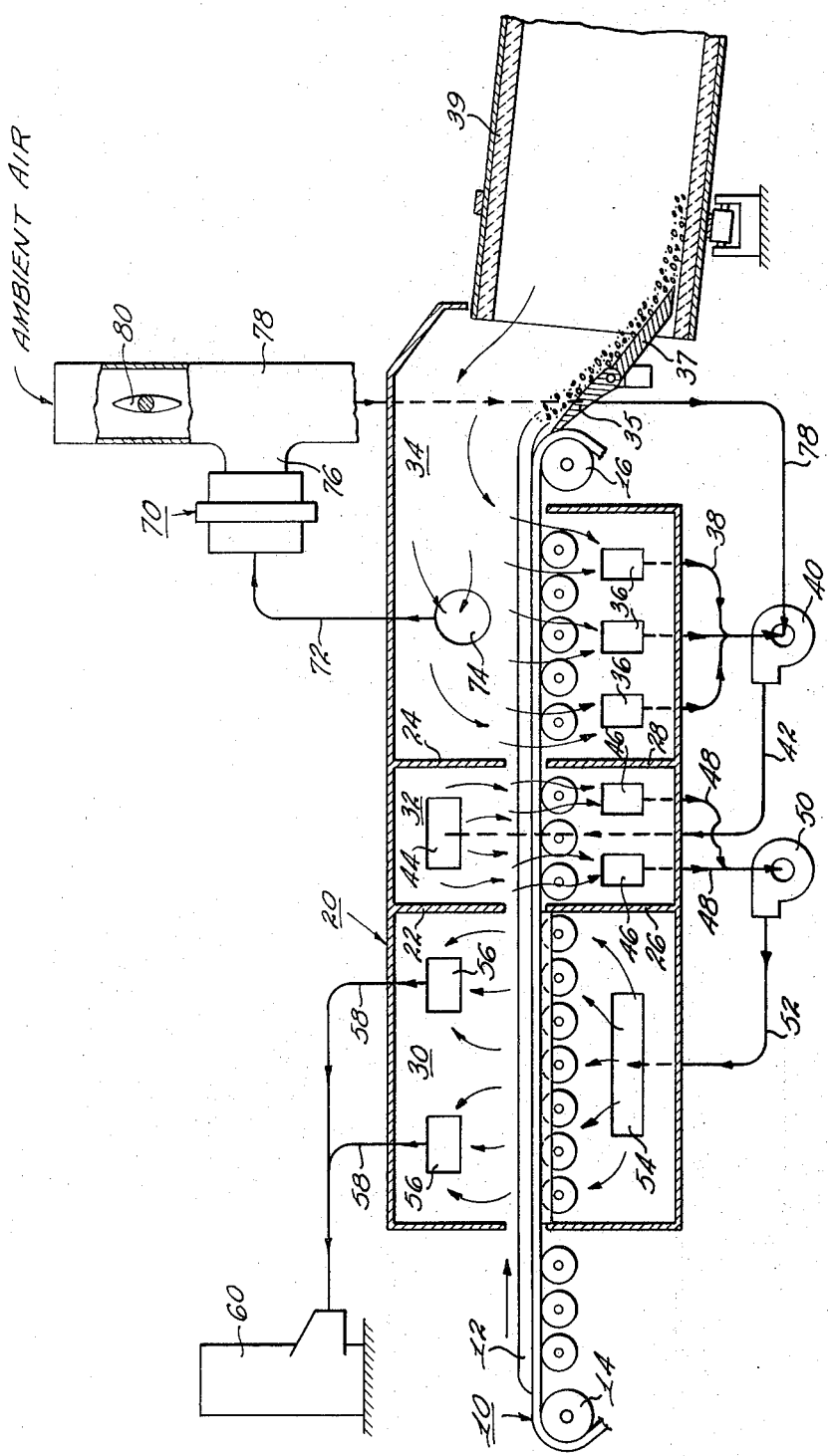

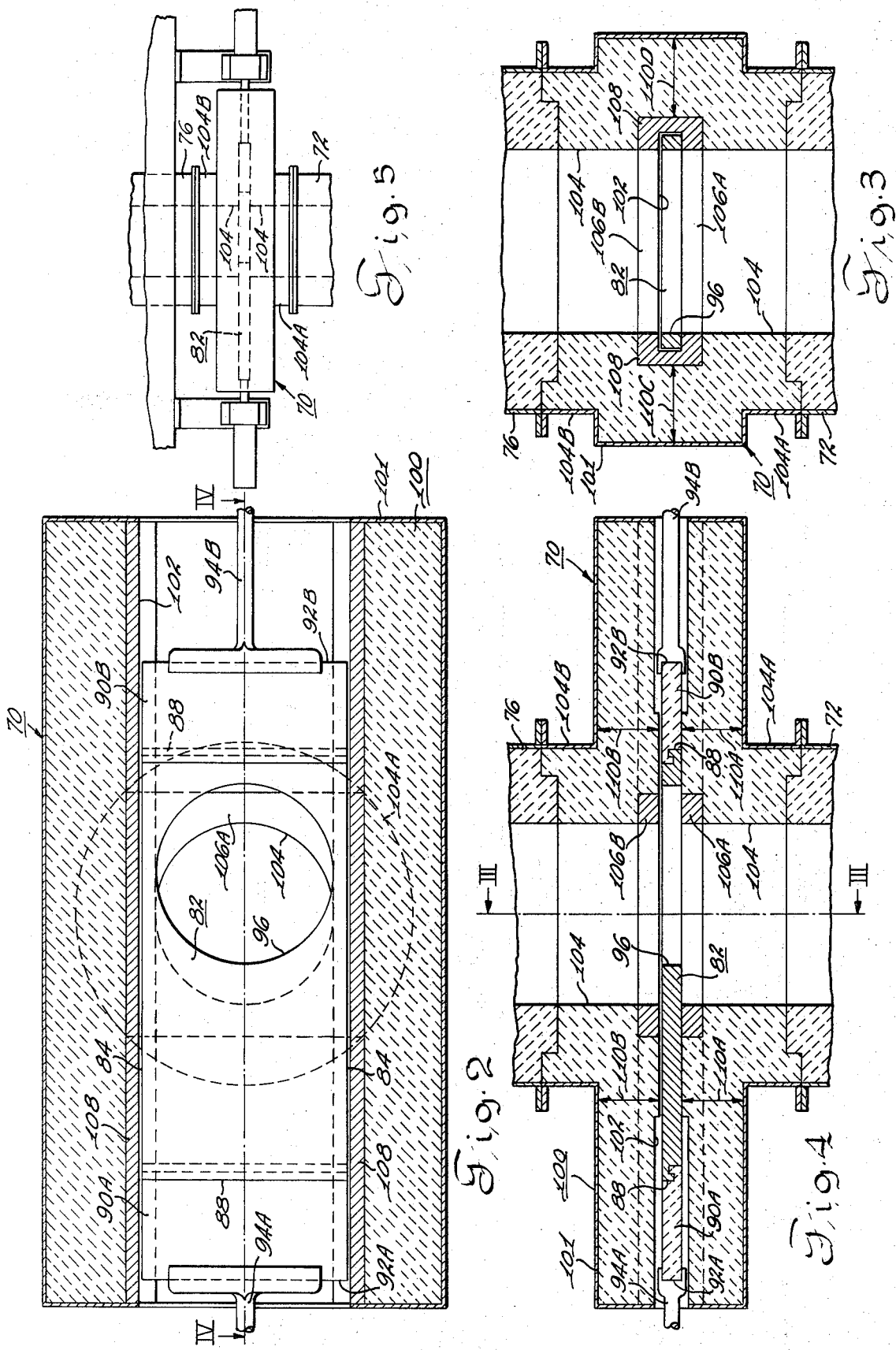

HIGH TEMPERATURE VALVE

In a modified embodiment of the invention, there is provided a valve for use under high temperature conditions, comprising a "goggle" type valve having a pivotally movable gate member which is sandwiched between two stationary goggle-type valve sections. The stationary valve sections and the movable gate member are each respectively enclosed on their outer periphery with a corresponding metal housing or casing. The two stationary valve sections are provided with aligned tunnel sections or gas passages each terminating at the interface with the pivotally movable gate member with a silicon carbide valve seat. The valve seat of each stationary valve section is embedded in a thermally insulating refractory material which extends to the inner surface or periphery of the metal housing or casing of the respective stationary valve sections. The pivotally movable gate member is provided with an aperture bounded by an annular silicon carbide insert, the valve aperture being movable into varying degrees of registration with the gas passage through the stationary valve sections. Any portion of the solid area of the gate member which is movable into overlying relation to the gas passage of the stationary valve sections in any of the various positions of the gate member is formed of silicon carbide. The silicon carbide portions of the gate member are embedded in a thermally insulating refractory material which extends to the inner periphery of the metal housing or casing of the gate member. As in the case of the first embodiment, the thermally insulating refractory material of the stationary valve sections and of the pivotally movable gate member maintains the metal casings or housing of the respective stationary valve sections and of the gate member at a sufficiently low temperature to prevent thermal damage to the metal housings.

BACKGROUND OF THE INVENTION

1. Field of the Invention

This invention relates to fluid flow control and shut-off valves for controlling the flow of high temperature fluids such as hot gases or the like.

2. Description of the Prior Art

The metal valving elements of valves which are usually used for controlling extremely high temperature gases, and in a dusty environment, such as are encountered in by-passing preheat gases in a Grate-Kiln system, for example, are often subject to corrosion, erosion, and warpage which reduces the ability of the valve to properly control the flow of gases through the valve, including the ability of the valve to completely shut off flow of gases through the valve when required. Valves of the type used for controlling the by-passing of preheat gases in a Grate-Kiln system, for example, control the flow of gases having a temperature which may be of the order of magnitude of 2,000°–2,200° Fahrenheit.

STATEMENT OF THE INVENTION

It is an object of the present invention to provide a regulating and control valve for controlling hot fluids such as hot gases which may have a temperature of the order of magnitude, for example, of 2,000° Fahrenheit, in which the valving elements of the valve structure which are in contact with the hot fluid, such as hot gases or the like, are formed of a refractory material such as silicon carbide which is very durable and erosion resistant and relatively dimensionally stable under changing temperature conditions, and which can be subjected to "thermal shock" (i.e., a drastic rate of temperature change) without mechanical or physical deterioration.

It is a further object of the invention to provide a fluid flow regulating and control valve particularly suitable for use with high temperature fluids in which the valving elements such as the movable valve element and the valve seats are formed of an erosion resistant refractory, preferably silicon carbide, and in which the refractory valve elements are surrounded by, or encased in suitable thermal insulating material such as a thermal insulating refractory which limits transfer of heat to the metal housing or casing of the valve.

In achievement of these objectives, there is provided in accordance with one embodiment of the invention for use under high temperature conditions a linearly slidable valve member made of silicon carbide and having a valve aperture therein which is slidably movable into or out of registry or into varying degrees of registry with a fluid passage through the stationary valve bonnet. The slidable silicon carbide valve member cooperates with stationary valve seats in the stationary bonnet structure, which valve seats are also made of silicon carbide. The slidable valve member is guided in its sliding movement by channel-shaped guide members in the stationary bonnet, the guide members also being made of silicon carbide. The stationary valve bonnet in which the slidable valve member is mounted for sliding movement is provided with an outer metal housing of carbon steel or the like and a wall of thermally insulating refractory is interposed between the silicon carbide members (including the slidable valve element) and the metal housing to maintain the metal housing at a sufficiently low temperature to prevent thermal damage to the metal housing.

In a modified embodiment of the invention there is provided a valve for use under high temperature conditions, comprising a "goggle" type valve having a pivotally movable gate member which is sandwiched between two stationary "goggle" type valve sections. The stationary valve sections and the movable gate member are each respectively enclosed on their outer periphery with a corresponding metal housing or casing. The two stationary valve sections are provided with aligned tunnel sections or gas passages each respectively terminating at the interface with the pivotally movable gate member with a silicon carbide valve seat. The valve seat of each stationary valve section is embedded in thermally insulating refractory material which extends to the inner surface or periphery of the metal housing or casing of the respective stationary valve section. The pivotally movable gate member is provided with an aperture bounded by an annular silicon carbide insert, the valve aperture being movable into varying degrees of registration with the gas passage through the stationary valve sections. Any portion of the solid area of the gate member which is movable into overlying relation to the gas passage of the stationary valve sections in any of the various positions of the gate member is formed of silicon carbide. The silicon carbide portions of the gate member are embedded in a thermally insulating refractory material which extends to the inner periphery of the metal housing or casing of the gate member. As in the case of the first embodiment, the thermally insulating refractory material of the stationary valve sections and of the pivotally movable gate member maintains the metal casings or housing of the respective stationary valve sections and of the gate member at a sufficiently low temperature to prevent thermal damage to the metal housing.

The valve member of the invention will be described as used as a by-pass or bleeder valve for bypassing excess hot gases from the preheat section of a Grate-Kiln system, and the valve has particular utility when used in such an environment. However, the valve of the invention may also be used in other environments in which it is desired or necessary to handle hot fluids such as hot gases.

Further objects and advantages of the invention will become apparent from the following description taken in conjunction with the accompanying drawings in which:

BRIEF DESCRIPTION OF THE DRAWINGS

FIG. 1 is a schematic view of a Grate-Kiln system embodying a high temperature gas by-pass valve in accordance with the invention;

FIG. 2 is a view in longitudinal section of an embodiment of the invention in which the movable valve member is linearly slidable;

FIG. 3 is a view in transverse section along lines III—III of FIG. 4;

FIG. 4 is a view in horizontal section along line IV—IV of FIG. 2;

FIG. 5 is a view in vertical elevation of the valve of FIGS. 2–4;

DESCRIPTION OF THE PREFERRED EMBODIMENT

Figure 6:
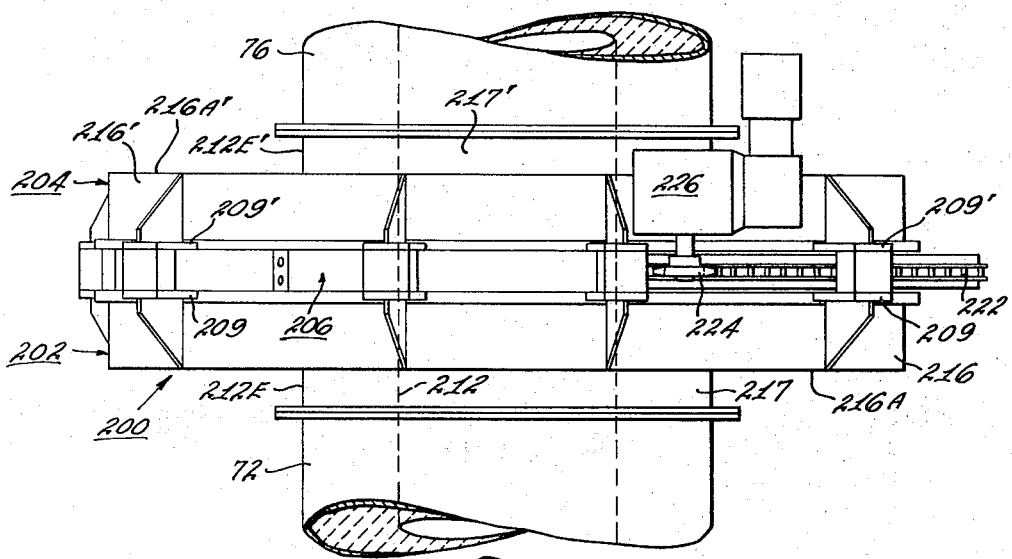
FIG. 6 is a view in vertical elevation of a "goggle" type valve assembly in accordance with another embodiment of the invention.
Figure 13:
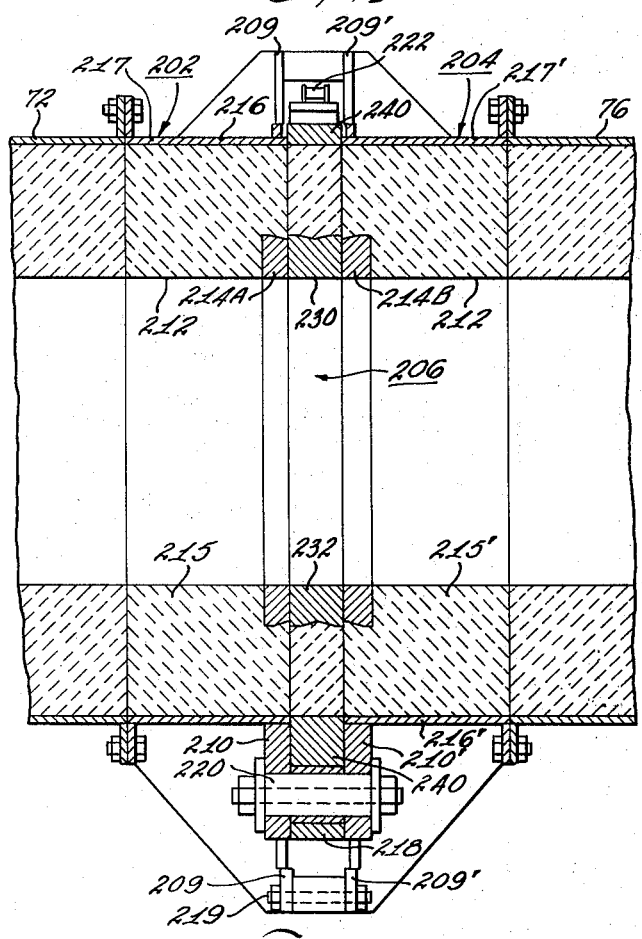
FIG. 13 is a view taken in transverse section along line XIII—XIII of FIG. 11.

Referring now to FIG. 1, there is shown a moving grate conveyor generally indicated at 10 which receives at the feed end or left-hand end thereof with respect to the view of FIG. 1, material such as ore or the like in the form of pellets or compacts which form a bed 12 on the upper surface of the conveyor. Conveyor 10 is trained around shafts 14 and 16 at the opposite ends thereof, and enters and passes through the hooded enclosure generally indicated at 20, which is divided by suitable partitioning means 22, 24, 26 and 28 into an updraft drying section generally indicated at 30, a downdraft drying section generally indicated at 32, and a preheat section generally indicated at 34. A stripper 35 is positioned at the discharge end of the grate conveyor and delivers the material to a chute 37 which in turn delivers the material being processed to a rotary kiln 39.

Hot gases discharged from the kiln pass into the upper portion of the preheat section 34, thence downwardly through the pelletized load 12 and through the slotted or otherwise apertured grate conveyor into the wind boxes 36 and thence through conduits 38 to the intake of fan 40. Fan 40 discharges through conduit 42 to a furnace 44 positioned above the load material on conveyor 10 in the downdraft drying section 32. The warm gases are discharged by furnace 44 in a downdraft direction and pass downwardly through the load 12 and through the apertured conveyor 10 to the windboxes 46 beneath the conveyor in the downdraft section 32. The gases pass from wind-boxes 46 through conduit means 48 to the intake of fan 50. The output of fan 50 is directed through conduit 52 to a windbox 54 located beneath conveyor 10 in updraft drying section 30. The warm gas is discharged from windbox 54 and passes upwardly through the conveyor and through the pelletized load 12 on the conveyor and thence into the furnace 56 from whence the gas passes through conduits 58 into the exhaust stack 60.

The hot gases which enter the preheat section 34 from the kiln 39 may have a temperature, for example, of the order of magnitude of 2,000°–2,200°Fahrenheit. It sometimes happens that the quantity or volume of the preheat gases which enter the preheat section 34 are excessive to the extent that the excess quantity of hot gases may adversely affect the heat treating process for the ore pellets or the like which should occur in the preheat section 34.

In order to control the quantity of volume of hot gases in the preheat section, it has been known in the prior art to bypass or "bleed" off a predetermined portion of the hot gases in preheat section 34 whereby to maintain the proper thermal relationships for the ore pellets or the like being treated. In order to control the volume of by-passed gas, a valve generally indicated to 70 is provided and is connected by a duct 72 to an outlet port or opening 74 in the portion of enclosure 20 which encloses preheat section 34.

The discharge end of valve 70 is connected by a short duct section 76 to a duct 78 which is connected at its downstream end to the inlet end of fan or pump 40. Upstream of the connection of valve 70 to duct 78, the duct 78 is connected to a source of cooling air which may be at ambient temperature. A suitable valve means 80 is connected in the duct 78 upstream of the connection of the valve 70 to duct 78 to control the flow of ambient air through the duct 78.

Thus, the arrangement diagrammatically shown in FIG. 1 permits the quantity of preheat gases which are by-passed through duct 72, valve 70, and duct 78 to pump 40 to be controlled by controlling the degree of opening of the valve 70. The valve 70 may be left completely closed if it is not desired or necessary to by-pass any of the hot gases from the preheat section 34. Also the introduction of the ambient cooling air into duct 78 under the control of butterfly valve 80 or other suitable valve means permits a predetermined desired quantity of cooling ambient air to be mixed with the hot gases which have been by-passed from the preheat secton 34. The quantity of ambient air which is mixed with the by-passed hot gases is typically of sufficient volume, for example, to reduce the temperature of the by-passed gases to approximately 800° Fahrenheit from their original temperature of, for example, 2,000°–2,200° Fahrenheit. The cooled by-passed gases from preheat section 34 are directed by fan 40 to downdraft section 32.

Referring now to FIGS. 2–5, inclusive, there is shown one embodiment of a valve 70 in accordance with the invention which may be used in the environment shown in FIG. 1. The valve assembly generally indicated at 70 includes a slidably movable valve plate member 82 made of silicon carbide. Valve plate member 82 is of generally rectangular shape and includes a pair of parallel spaced longitudinal edges each indicated at 84 and a pair of parallel spaced end edges 88 which extend perpendicularly to the longitudinal edges 84. A corresponding thermally insulating plate 90A, 90B made of a suitable thermally insulating refractory material or the like, is suitably secured to each of the respective opposite end edges 88 of the silicon carbide plate 82 by a tongue-in-groove connection or the like. The opposite longitudinal edges of the respective insulating plates 90A, 90B in effect form a continuation of the longitudinal edges 84 of the silicon carbide plate 82. Opposite pushrods 94A, 94B are suitably secured to the end edges 92A, 92B of the respective insulating plates 90A, 90B. Insulating plates 90A, 90B thermally insulate pushrods 94A, 94B from silicon carbide valve plate 82. Suitable motor means, not shown, are connected to one or both of the pushrods 94A, 94B whereby to impart a linear movement to the silicon carbide valve plate 82 is required. The motor means which operates the slidably movable valve plate may be automatically operated in response to an appropriate sensing means (not shown) which senses a condition such as gas pressure or gas flow in preheat section 34 (FIG. 1) or other condition indicative of a need to by-pass gas from the preheat section 34 through valve 70.

The valve generally indicated at 70 includes a stationary bonnet structure generally indicated at 100 which houses the movable silicon carbide valve plate 82. Bonnet 100 includes an outer metal housing 101 formed of carbon steel or the like. Bonnet 100 is provided with a slotted passage 102 which extends for the entire length of bonnet 100 and through which the movable part of the valve assembly is slidably movable when one or the other of the pushrods 94A, 94B is actuated. The slot 102 is wider at the portion thereof which receives the pushrod members 94A, 94B. At any operating position to which it may be moved, the silicon carbide valve plate 82 lies within slotted passage 102.

The slidably movable valve plate 82 is provided, intermediate its length, with a circular aperture 96 which is movable into or out of registry, or into various degrees of registry with respect to the tunnel generally indicated at 104 in valve bonnet 100. The tunnel 104 is connected at one end, for example, the lower end, with respect to the view of FIGS. 4 and 5, to the duct 72 which leads to the preheat section 34 (FIG. 1) and, at its opposite end, tunnel 104 is connected to duct section 76 which transmits the by-passed preheat gases to duct 78 (FIG. 1).

The stationary bonnet 100 is of substantially rectangular cross section except in the region of tunnel 104, where the bonnet is additionally provided with short cylindrical extensions 104A and 104B which are coaxial with and house tunnel 104.

The slidable valve plate 82 may be moved to one extreme position in which aperture 96 of the valve plate is in complete registry with tunnel 104, for fully open position of the valve 70; or plate 82 may be moved to an opposite extreme position in which aperture 96 is completely out of registry with tunnel 104 for the completely closed position of valve 70; or plate 82 may be moved to any intermediate position between the two extremes just mentioned to provide a partial opening of valve 70.

Immediately contiguous the plane of the sliding valve plate 82 and on opposite sides of that plane, and in coaxial alignment with tunnel 104, the valve bonnet 100 is provided with annular valve seats indicated at 106A and 106B respectively. The valve seats 106A and 106B, like the slidable valve 82, are made of silicon carbide. The bonnet 100 is also provided in the plane of the slidable valve plate 82, and contiguous the opposite longitudinal edges 84 of valve plate 82, with stationary channel members indicated at 108 also formed of silicon carbide which extend for the length of the valve structure and which receive the opposite edges 84 of valve plate 82 to guide the sliding movement of the sliding valve plate 82.

It will thus be seen that the linearly slidable valve plate 82, the stationary valve seats 106A and 106B, and the longitudinally extending stationary channel members 108 which guide the linear sliding movement of the valve plate 82 are all formed of silicon carbide. Thus, all portions of the valve structure which perform a valving action and which are in direct contact with the hot gases are formed of silicon carbide, which, as previously pointed out, is very durable and erosion resistant, and relatively dimensionally stable under the changing temperature conditions to which it would be subjected in an environment such as that shown in FIG. 1 of the drawings. The silicon carbide elements have good thermal shock characteristics, i.e. they can tolerate drastic rates of temperature change without mechanical or physical deterioration, such as warping or other deformation.

A further important feature of the construction is the fact tht the valve bonnet 100 which houses the sliding valve member 82 is provided with relatively thick walls indicated at 110A, 110B, 110C, 110D (FIGS. 3 and 4) formed of a thermally insulating refractory material which limits the dissipation of heat from the silicon carbide elements 82, 106A, 106B, 108 to the outer metal casing 101, to thus thermally insulate the metal casing 101 from the hot silicon carbide valve elements, to prevent thermal damage to the metal casing. Typically, if the silicon carbide elements are at an operating temperature of, for example, 2,000°–2,200° Fahrenheit, the temperature of the outer metal casing 101 may typically be reduced to a temperature of the order of 250° Fahrenheit by the thermally insulating refractory material of which the walls 110A, etc., are made.

The thermally insulating refractory material of which the walls 110A, etc., of the stationary valve bonnet 100 are made is initially in a soft plastic state and is cast into suitable forms where it hardens in place. The silicon carbide valve seats 106A, 106B and the silicon carbide guide members 108 are solid members and are embedded at the proper location in the initially soft thermally insulating refractory material, which hardens in place about the silicon carbide valve seats 106A, 106B, and about the silicon carbide guide members 108.

Referring now to FIGS. 6-13, inclusive, there is shown another embodiment of the invention as embodied in a valve of "goggle" type, generally indicated at 200. Valves of this general type are known per se and are referred to in the art as "goggle" type valves. The valve 200 includes two stationary sections respectively generally indicated at 202 and 204 and a pivotally mounted valve gate generally indicated at 206 which is sandwiched between stationary valve sections 202 and 204 and which may be swung about its pivot point relative to stationary sections 202 and 204 to a position in which (1) the valve is completely open; or (2) the valve is completely closed; or (3) the valve is in any desired position intermediate the fully open and the fully closed position.

The two stationary sections 202 and 204 of the "goggle" type valve are similar to each other and the section 202 shown in FIG. 7 will be described as typical of both the sections 202 and 204. It will be noted that the section 202 includes what might be referred to as a central section A embraced by the arc A' and two outer lobes B and C embraced by the arcs B' and C', respectively. The pivotal support point for the swinging gate member 206 which will be described hereinafter is located at a point indicated at 208 on a lug 210 on stationary section 202 defining a junction between contiguous ends of the two lobes B and C. In the illustrated embodiment, the arc A' extends approximately 100° on a radius drawn from the pivot point 208.

Tunnel 212 extends axially through the central portion A of valve section 202. Tunnel 212 is symmetrically located relative to the arcuate span A' through which portion A extends, and thus tunnel 212 is symmetrically located relative to lobes B and C. An annular valve seat 214A of silicon carbide surrounds the tunnel 212 at the interface or surface of the stationary goggle structure 202 which faces the pivotally movable valve gate 206. As best seen in the sectional view of FIG. 8, the valve seat 214A extends only a relatively short portion of the total axial length of the tunnel 212. Tunnel 212 through valve section 202 typically may be 13 inches in axial length and valve seat 214A typically may extend for 2 inches of the 13 inch length of the tunnel 212 in valve section 202.

A portion of the axial length of tunnel 212 indicated at 212D (FIG. 8) extends from the axially innermost surface of stationary valve section 202 which faces valve gate 206, to the axially outermost end of the main body of valve section 202 (the main body being defined by the "goggle" shaped perimeter). The tunnel 212 then projects part of the axial length of the tunnel as indicated at 212E in FIGS. 6 and 8 beyond the axially outermost end of the main body of valve section 202 where it is coupled to the duct 72 (FIG. 1, 6 and 13) of the preheat by-pass system.

The outer periphery of the main body of the stationary valve member 202 (i.e., the "goggle" shaped body portion) is bounded by a suitable metal frame or casing indicated at 216 and the space between the outer periphery of the tunnel 212 including the outer periphery of the silicon carbide valve seat 214A and the inner periphery of the bounding metal frame 216 is filled with a thermally insulating refractory material 215 which is initially cast in a substantially fluid or soft plastic form and which then hardens to form a hard refractory filling which occupies the entire space between the inner limit defined by the outer periphery of tunnel 212 including the annular valve seat 214A of silicon carbide and an outer limit defined by the inner periphery of metal frame 216 which bounds the main body of "goggle" shaped body portion of stationary valve section 202.

The portion 212E (FIGS. 6 and 8) of the tunnel 212 which projects axially beyond the main body of the stationary valve section 202 is insulated by a thick cylindrical wall of thermally insulating refractory material 215 like that carried by the main body portion of valve section 202. The outer periphery of the cylindrical wall of the insulating material for tunnel section 212E is bounded by a metal cylindrical casing indicated at 217. Typically the internal diameter of tunnel 212 may be 24 inches, while the internal diameter of metal casing 217 may be 45 inches. Thus, the radial thickness of the thermally insulating refractory material surrounding tunnel section 212E (i.e., the portion of tunnel 212 projecting beyond the main body of the "goggle" shaped stationary valve section 202) may be 10.5 inches, for example.

The metal casing 216 which encloses the stationary valve section 202 also encloses the axial end of the main body portion of valve section 202 which is remote from gate 206 as indicated at 216A. The metal casing portion 216A extends radially outwardly from the outer periphery of the tunnel portion 212E to the outer peripheral boundary of valve section 202 to completely enclose the axial end of valve section 202 which is remote from gate 206. The castable thermal insulating refractory 215 in valve section 202 extends to the axially inner surface of metal casing portion 216A.

The stationary valve section 204 is similar to the stationary section 202 just described, with corresponding parts being marked with a prime (') in valve section 204. The two valve sections 202 and 204 are mounted in axial alignment with each other in rigidly fixed relation with respect to each other by suitable fastening means such as bolts 219 or the like, which extend through the bridge ties 209 at the outer periphery of the respective sections 202 and 204. The facing surfaces of the two stationary valve sections 202 and 204 are spaced apart sufficiently to receive the pivotally mounted gate member 206 (FIG. 6) with sufficient operating clearance to permit movement of the gate member 206 between the two stationary valve sections 202 and 204 without binding. The stationary valve section 204 is provided with a silicon carbide valve seat 214B coaxially positioned about tunnel 212 at the interface with valve gate 206. Tunnel 212 extends through the main body portion of stationary valve section 204 and projects beyond the main body section for connection to duct 76 in a manner similar to valve section 202, as previously described. The valve seat 214B of stationary valve section 204 is embedded in a body of thermally insulating refractory material similar to the refractory material 215 described in connection with the stationary section 202, and the projecting portion 212E' of tunnel 212 (FIG. 6) is surrounded by an insulating wall of thermally insulating refractory in the same manner as described for stationary valve section 202. A cylindrical metal casing 217' encloses projecting tunnel section 212E'.

Figures 9, 10:
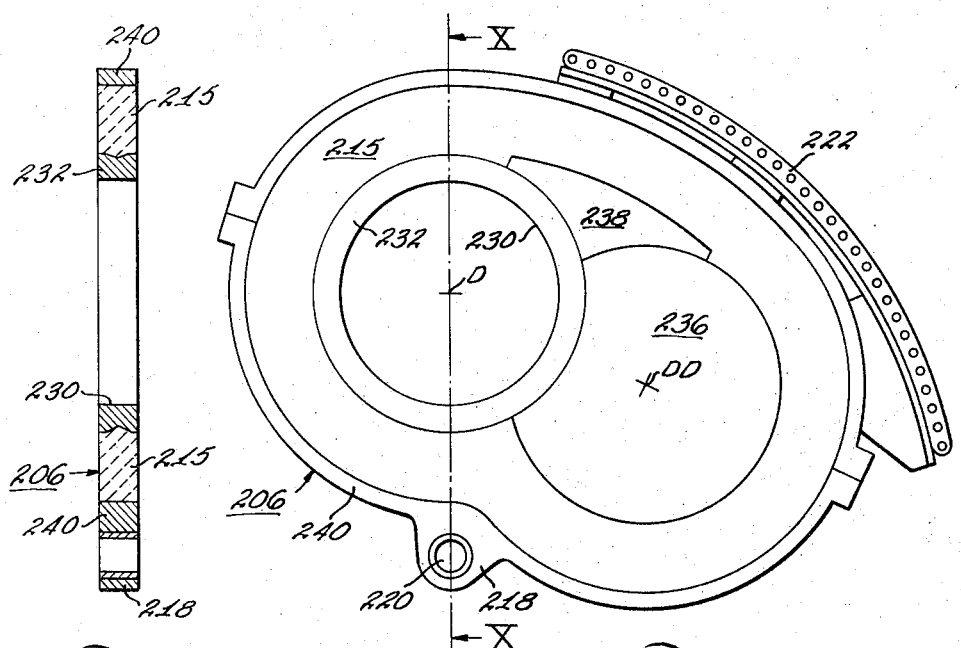
FIG. 9 is a top plan view of the movable gate member which may be pivotally swung relative to the stationary part or bonnet of the goggle valve assembly of FIG. 6 to control the flow of fluid through the valve.
FIG. 10 is a view in transverse section along line X—X of FIG. 9.

Referring now to FIG. 9, the gate member 206 is provided with a lug member 218 by means by which the gate member 206 is pivotally connected to the lugs 210 and 210' of the respective stationary valve sections 202 and 204, and a suitable pivot pin or the like 220 connects the lug 218 of the pivotally movable gate member 206 to the stationary lugs 210 and 210' of the respective stationary valve sections 202 and 204 (see FIG. 9).

Pivot pin 220 defines the pivotal axis about which gate member 206 is pivotally movable. The outer peripheral edge of the movable gate member 206 which is opposite the pivotal connection of the gate member is provided with arcuate rack-like gear member 222 or gear chain which is fixed to gate member 206 and which is driven by a pinion gear or sprocket 224 driven by a suitable motor and reduction gear means generally indicated at 226 whereby to impart pivotal movement of the gate member about its pivotal axis 220 to control the degree of opening of the valve member.

The motor and reduction gear 226 may be driven to operate the gearing 224–222 to pivotally move the gate member 206 about its pivotal axis 220 in response to a suitable signal which is indicative of the need or requirement to by-pass excess gases from the preheat section 34 (see FIG. 1).

Instead of using the arrangement just described for imparting pivotal movement to gate member 206, the gate member 206 can also be pivotally moved through an arcuate path by means of a linear motion unit such as a fluid operated cylinder which would be clevis-attached to the gate member 206.

The movable gate member 206 is provided with an aperture 230 which may be moved into or out of registration with the tunnel 212 of the stationary valve sections 202 and 204, or into varying degrees of registration with tunnel 212. The aperture 230 of the movable valve member 206 is lined with an annular valve member 232 which is made of silicon carbide. The annular silicon carbide member 232 extends for the entire axial length (typically this might be about 4 inches) of the movable valve gate 206, and the opposite surfaces of the silicon carbide valve element 232 are adapted to seat on the annular silicon carbide valve seats 214A and 214B which are respectively mounted on the stationary valve sections 202 and 204.

Figures 7, 8:
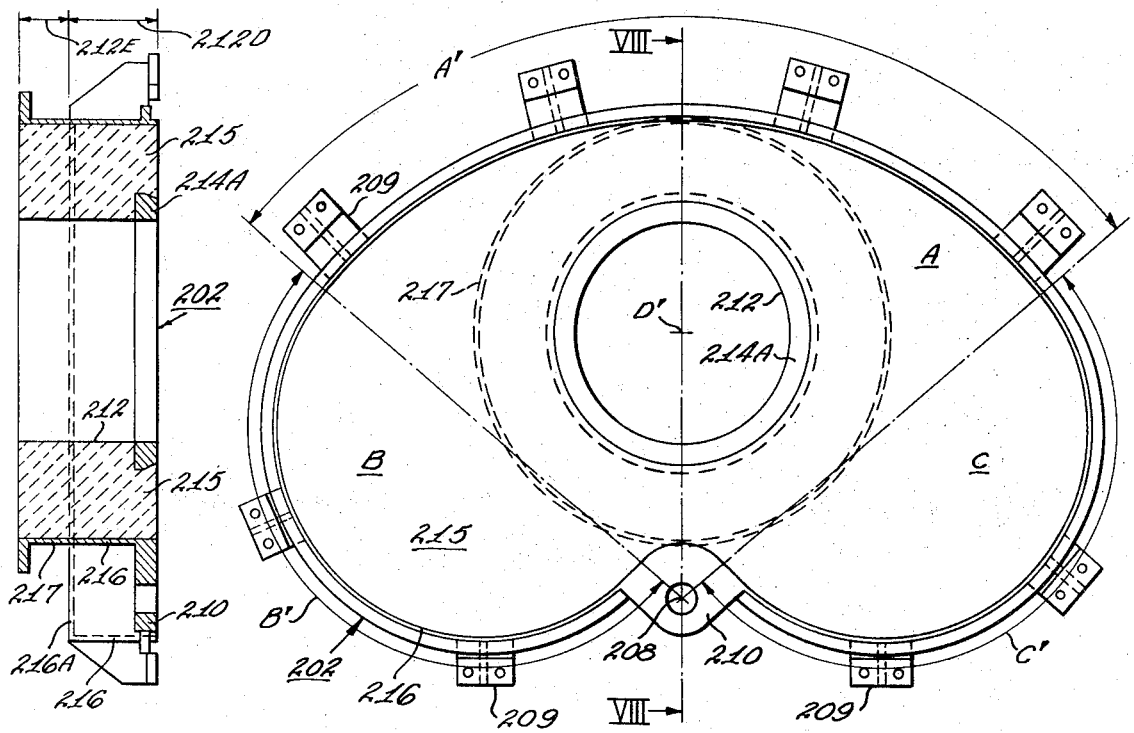
FIG. 7 is a top plan view of one of the two halves of the stationary part or "bonnet" of the "goggle" type valve assembly of FIG. 6.
FIG. 8 is a view in transverse section along line VIII—VIII of FIG. 7.

The center D of the annular-shaped silicon carbide valve element 232 (FIG. 9) lies at the same radial distance from the pivotal axis 220 of the pivotally movable valve member 206 as does the center D' of the silicon carbide valve seats 214A and 214B of the respective stationary valve sections 202 and 204 as indicated in FIG. 7 of the drawings. The point D', of course, also lies on the central longitudinal axis of the tunnel 212. Hence, the movable valve member 206 may be swung about its pivotal connection 220 to a position in which the points D and D' are in registry with each other, in which case, the valve is fully open and the aperture 230 in the movable valve member 206 is then in coaxial registration with the circular cross-sectional opening of the tunnel 212 to thereby provide a complete opening of the valve.

Figure 11:
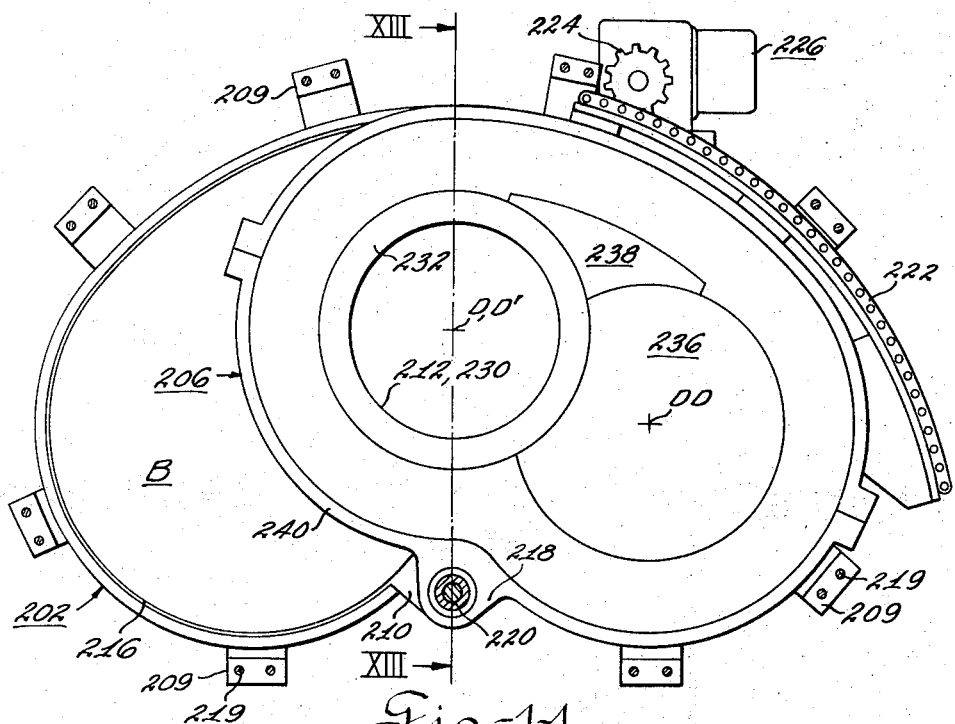
FIG. 11 is a view showing the movable gate member of the goggle valve assembly moved to the fully opened position relative to the stationary part of the goggle valve assembly.
Figure 12:
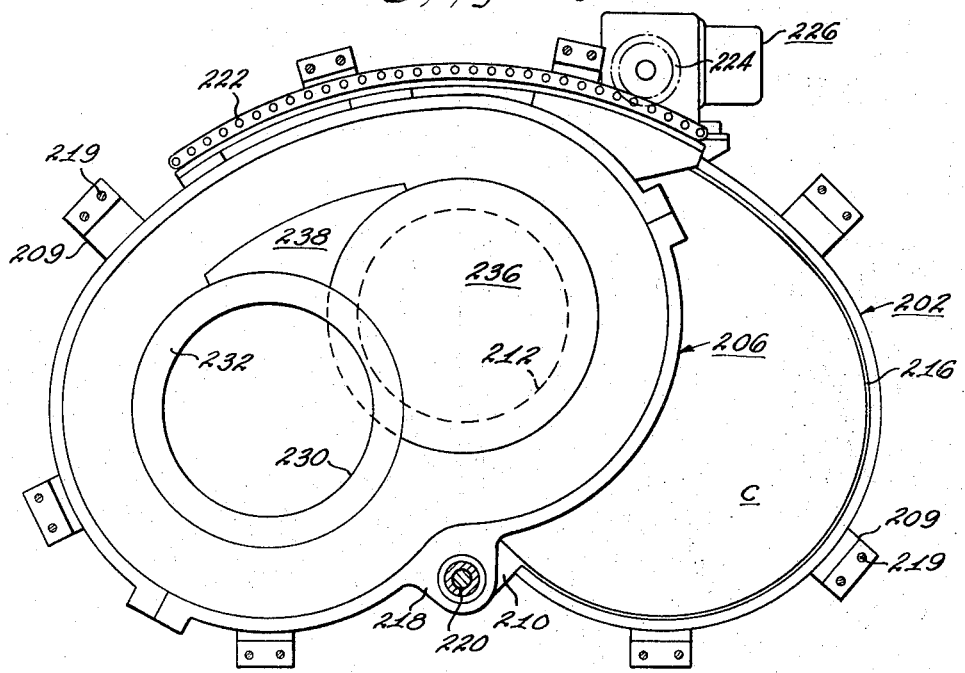
FIG. 12 is a view similar to FIG. 11, but showing the movable gate of the goggle valve assembly moved to a fully closed position.

As seen in FIGS. 9, 11 and 12, the movable gate member 206 is also provided with a solid substantially disk-like insert member 236 of generally circular shape and made of silicon carbide which is of somewhat greater diameter than the tunnel 212 of the stationary valve sections 202 and 204. In the position of the pivotally movable valve member 206 shown in FIG. 12 of the drawings silicon carbide insert 236 is adapted to completely cover the tunnel opening 212 of the stationary valve sections 202 and 204 to define the completely closed position of the valve. The center DD of the generally circular-shaped silicon carbide insert 236 lies at the same radial distance fro the pivotal axis 220 of valve gate 206 as does the center D of the silicon carbide valve element 232 and the center D' of the stationary silicon carbide valve seats 214A and 214B previously described.

There is also provided a silicon carbide insert indicated at 238 which spans the space between the outer periphery of the annular silicon carbide valve insert 232 in gate 206 and the outer periphery of the silicon carbide insert 236 in valve gate 206. In any position of the movable valve gate 206 in which the tunnel 212 is partially closed by the valve gate 206, various combinations of the silicon carbide inserts 232, 236 or 238 may overlie the closed portion of the tunnel, depending upon the degree of opening of the gate 206 so that in any position of the valve gate 206 in which the valve gate is exposed to the hot gases in the tunnel 212, only a silicon carbide portion of the movable gate member 206 will be in contact with the hot gases, (i.e., either the annular silicon carbide valve element 232 or the silicon carbide inserts 236 and 238 or combinations thereof). In the completely open position of valve gate 206, only the annular silicon carbide insert 232 will be in direct contact with the hot gases.

As in the case of the stationary valve sections 202 and 204, the silicon carbide inserted portions, namely, the annular silicon carbide insert 232, the substantially circular solid disc-like silicon carbide insert 236 and the silicon carbide insert 238 are all "cemented" into place by a "mortar" consisting of an initially soft or plastic thermally insulating refractory material which is cast into place between the outer periphery of the respective silicon carbide inserts 232, 236 and 238 and the inner periphery of an enclosing metal frame 240 of gate 206. When the mortar-like thermally insulating refractory material solidifies and hardens, it holds the various silicon carbide inserts 232, 236 and 238 solidly in position as shown in the drawings. In the case of the pivotally movable gate member 206, the silicon carbide inserts 232, 236 and 238 extend the full axial depth or length of the gate member and the mortar-like material in which the silicon carbide inserts 232, 236 and 238 are embedded also extends the full axial length or depth of the gate member 206.

Due to the positioning or mounting of the silicon carbide valve seats 214A and 214B of the respective stationary valve sections 202 and 204 in a bed of thermally insulating refractory material 215 as previously described, and due to the positioning of the silicon carbide valve elements 232, 236 and 238 of the pivotally movable gate member 206 in a bed of thermally insulating refractory material 215, the silicon carbide inserts of both the movable and the stationary parts of the valve structure which are in contact with the hot gases are thermally insulated from the outer metal frame or housing 216 of the respective stationary valve sections 202 and 204 and from the metal frame or housing 240 of pivoted gate 206 in a manner similar to that described in connection with the embodiment of FIGS. 2–5 inclusive. Due to the use of the interposed thermally insulating refractory 215, the metal frames 216 and 240 typically may operate at a temperature of the order of magnitude of 250° Fahrenheit, at a time when the various silicon carbide inserts 214A, 214B, 232, 236, 238 which are in contact with the hot gases may be at a temperature of the order of magnitude of 2,000°–2,200° Fahrenheit. By thus causing the metal frames or housings 216, 240 to operate at a greatly reduced temperature as compared to the temperature of the silicon carbide inserts, the metal housings 216, 240 are protected against thermal damage which would cause deterioration of the metal housings.

The dimensions and contour of the outer periphery of the movable gate member 206 are such that in the fully open position of the valve as seen in FIG. 11, a substantial part of the solid portion of the gate (i.e., the nonapertured portion) lies between lobe C of stationary valve section 202 (FIG. 6) and the corresponding lobe of stationary valve section 204; and as seen in FIG. 12, in the fully closed position of gate member 206, a substantial part of the apertured portion of gate member 206 lies between lobe B of valve section 202 (FIG. 7) and the corresponding lobe of valve section 204. Also, the portion of the outer periphery of the movable gate 206 between the rounded opposite end portions of the gate member lies at the same radial distance from the pivot point 220 of the gate member 206 as does the outer periphery of the arcuate portion A of stationary valve sections 202 and 204, and therefore the outer periphery of gate member 206 between the rounded opposite end portions of the gate member is adapted to overlie the outer periphery of valve sections 202 and 204 anywhere along the arcuate portion A of the stationary valve sections. The radius of each of the opposite rounded end portions of gate 206 and the center from which each respective radius is drawn is such that in the extreme open position of the valve (FIG. 11) the right-hand arcuate end portion, relative to FIG. 11, of gate 206 coincides with the arcuate periphery of lobe C of the stationary valve section 202 and of the corresponding aligned lobe of valve section 204, while in the extreme closed position of the valve (FIG. 12), the left-hand arcuate end portion, relative to FIG. 12 of gate 206 coincides with the arcuate periphery of lobe B of the stationary valve section 202, and of the corresponding aligned lobe of valve section 204.

In the illustrated embodiment, in all positions of the movable gate member 206 from the fully open position (FIG. 11) to the fully closed position (FIG. 12) and including all intermediate positions, all portions of the outer periphery of the movable gate member 206 either coincide with or alternatively lie within the peripheral boundaries of the stationary valve sections 202 and 204.

The term "thermal insulating refractory" as used in describing the several embodiments of the invention means a refractory which has low heat conductivity and thus is a good thermal insulator. Such refractories are well known per se and are commercially available. For example, a typical castable refractory which would satisfy the foregoing requirements is sold by Harbison-Walker Refractories Company, Division of Dresser Industries, Inc., 2 Gateway Center, Pittsburgh, Penna. 15222, under the trade name "Harcast ES" and has a base composition of $Al_2O_3SiO_2$. Another castable refractory which would satisfy the thermal insulating requirements hereinbefore described is sold by A. P. Green Refractories Company, Mexico, Mo., (U.S.A.) under the trade name "Steelkon."

In the "goggle" type valve embodiment of FIGS. 6–13, inclusive, it is definitely preferred to use a castable thermal insulating refractory which is cast in mortar-like form and subsequently hardens. In the linear sliding type valve of FIGS. 2–5, the use of a castable thermal insulating refractory has been described in the illustrated embodiment. However, in the embodiment of FIGS. 2–5, the thermal insulating refractory may also be supplied in preformed blocks or the like which may be joined together by a suitable refractory mortar.

It is also obvious that the stationary bonnet structure 100 of the embodiment of FIGS. 2–5 could be made in a plurality of parts which are suitably secured together. For example, the stationary valve section or bonnet structure 100 of FIGS. 2–5 could be made as two similar half-sections lying on opposite sides of slotted passage 102 and which are suitably secured together in abutting relation to each other in the region of the slotted passage 102.

In the various preferred embodiments of the invention, the thermal insulating refractory material which is interposed between the silicon carbide elements and the metal casing has been described as filling the entire space and/or distance between the silicon carbide elements and the metal casing. However, it is obvious that if thermal insulation requirements are satisfied without having the thermal insulating refractory material interposed for the entire space and/or distance just mentioned that some other suitable material could be used to occupy part of the space and/or distance between the silicon carbide elements and the metal casing.

From the foregoing detailed description of the invention, it has been shown how the objects of the invention have been obtained in a preferred manner. However, modifications and equivalents of the disclosed concepts such as readily occur to those skilled in the art are intended to be included within the scope of this invention.

The embodiments of the invention in which an exclusive property or privilege is claimed are defined as follows:

1. A high temperature fluid flow control valve comprising a pair of stationary valve sections positioned in axial alignment with each other, a metal casing enclosing the external surface of each of said valve sections, a movable valve gate sandwiched between said stationary valve sections and mounted for pivotal movement relative to said stationary valve sections, a metal casing enclosing the outer periphery of said valve gate, said stationary valve sections each being of "goggle" shape at least at the interface with said valve gate, said "goggle" shape including a central area and oppositely disposed arcuate lobes symmetrically located on either side of said central area and terminating at a common junction, the pivotal axis of said valve gate being located at said common junction, a fluid flow passage extending through the central area of each stationary valve section, said movable valve gate comprising an aperture movable by pivotal movement of said valve gate into varying degrees of registry with said fluid flow passage of said aligned stationary valve sections whereby said fluid flow passage is either entirely open to flow of fluid therethrough, or entirely closed to flow of fluid therethrough, or partially open and partially closed to flow of fluid therethrough, at least the portions of said movable gate which are in direct contact with the high temperature fluid in any position of said movable valve gate being made of silicon carbide, at least all silicon carbide portions of said movable valve gate being sandwiched within the outer peripheral boundaries of said stationary valve sections in all operating positions of said valve gate, each stationary valve section comprising valve seat means formed of silicon carbide and located at the interface between said fluid flow passage and said valve gate, said valve seat means being adapted to cooperate with said movable valve gate, a thermally insulating refractory material positioned in thermally insulating relation between the metal casing of each respective stationary valve section and the silicon carbide valve seats of the respective stationary valve sections, and a thermally insulating refractory material positioned in thermally insulating relation between the metal casing of said valve gate and the silicon carbide portions of said valve gate.

2. A high temperature fluid flow control valve as defined in claim 1 in which said valve controls the flow of fluids having a temperature of the approximate order of magnitude of 2,000°–2,200° Fahrenheit.

3. A high temperature fluid flow control valve as defined in claim 1 in which substantially the entire area of said movable valve gate is sandwiched between said stationary valve sections in all operating positions of said valve gate.

4. A high temperature fluid flow control valve as defined in claim 1 which is adapted to be used for controlling the flow of hot gas by-passed rom the preheat section of a Grate-Kiln system.

5. A high temperature fluid flow control valve comprising a pair of stationary valve sections positioned in axial alignment with each other, each of said stationary valve sections including a fluid flow passage therethrough in axial alignment with the fluid flow passage of the other of said stationary valve sections, a valve gate sandwiched between said stationary valve sections, said valve gate being pivotally movable relative to said stationary valve sections, metal casing means enclosing said valve, said valve gate having an aperture therein which is movable by pivotal movement of said valve gate into varying degrees of registry with said fluid flow passages of said stationary valve sections whereby said aligned fluid flow passages are either entirely open to flow of fluid therethrough, or entirely closed to flow of fluid therethrough, or partially open and partially closed to flow of fluid therethrough, substantially all portions of said movable valve gate which are in direct contact with the high temperature fluid in any position of said movable valve gate being made of silicon carbide, each of said stationary valve sections comprising valve seat means formed of silicon carbide, said valve seat means of said stationary valve sections cooperating with said silicon carbide portions of said movable valve gate, the respective valve seat means being positioned at the interface between the fluid flow passage of each respective stationary valve section with the movable valve gate, and a thermally insulating material positioned in thermal insulating relation between said metal casing means and silicon carbide portions of said valve.

6. A high temperature fluid flow control valve as defined in claim 5 in which any portion of said movable valve section made of silicon carbide is embedded in a thermally insulating refractory material which is carried by said movable valve section.

7. A high temperature fluid flow control valve as defined in claim 5 which is adapted to be used for controlling the flow of hot gas by-passed from the preheat section of a Grate-Kiln system.

8. A high temperature fluid flow control valve as defined in claim 5 in which said thermally insulating material is a thermally insulating refractory.

9. A high temperature fluid flow control valve as defined in claim 5 in which said valve controls the flow of fluids having a temperature of the approximate order of magnitude of 2,000°–2,200° Fahrenheit.

10. A high temperature fluid flow control valve as defined in claim 5 in which said valve is of the "goggle" type.

11. A high temperature fluid flow control valve comprising a pair of stationary valve sections positioned in axial alignment with each other, each of said stationary valve sections including a fluid flow passage therethrough in axial alignment with the fluid flow passage of the other of said stationary valve sections, a movable valve gate sandwiched between said stationary valve sections, metal casing means enclosing said valve, said valve gate having an aperture therein which is movable by movement of said valve gate into varying degrees of registry with said fluid flow passage of said stationary valve sections whereby said aligned fluid flow passages are either entirely open to flow of fluid therethrough, or entirely closed to flow of fluid therethrough, or partially open and partially closed to flow of fluid therethrough, substantially all portions of said movable valve gate which are in direct contact with the high temperature fluid in any position of said movable valve gate being made of silicon carbide, each of said stationary valve sections comprising valve seat means formed of silicon carbide, said valve seat means of said stationary valve sections cooperating with said silicon carbide portions of said movable valve gate, the respective valve seat means being positioned at the interface between the fluid flow passage of each respective stationary valve section with the movable valve gate, and a thermally insulating material positioned in thermal insulating relation between said metal casing means and silicon carbide portions of said valve, any portion of said movable valve gate made of silicon carbide being embedded in a thermally insulating refractory material carried by said valve gate.

12. A high temperature fluid flow control valve as defined in claim 11 which is adapted to be used for controlling the flow of hot gas by-passed from the preheat section of a Grate-Kiln system.

* * * * *